(12) United States Patent
Ashley et al.

(10) Patent No.: US 6,960,129 B2
(45) Date of Patent: Nov. 1, 2005

(54) CONDITIONED VESTIBULE FOR A COLD STORAGE DOORWAY

(75) Inventors: Paul Ashley, Scotby (GB); Colin D. Johnstone, Annan (GB); Peter R. Smith, Lewistown, MT (US)

(73) Assignee: HCR Incorporated, Lewistown, MT (US)

( * ) Notice: Subject to any disclaimer, the term of this patent is extended or adjusted under 35 U.S.C. 154(b) by 0 days.

(21) Appl. No.: 10/754,678

(22) Filed: Jan. 9, 2004

(65) Prior Publication Data

US 2004/0192187 A1 Sep. 30, 2004

(30) Foreign Application Priority Data

Jan. 14, 2003 (GB) .............................................. 0300729

(51) Int. Cl.[7] .............................................. F25D 17/04
(52) U.S. Cl. ........................... 454/188; 62/256; 62/408; 454/192; 454/195
(58) Field of Search ...................... 454/188, 190, 454/191, 192, 195; 62/256, 408

(56) References Cited

U.S. PATENT DOCUMENTS

| | | | |
|---|---|---|---|
| 2,939,374 A | * | 6/1960 | Caille .......................... 454/191 |
| 3,089,403 A | * | 5/1963 | Banko ......................... 454/192 |
| 3,190,207 A | * | 6/1965 | Weisz .......................... 454/191 |
| 3,218,952 A | * | 11/1965 | Gygax ......................... 454/192 |
| 3,270,655 A | * | 9/1966 | Guirl et al. .................. 454/188 |
| 3,608,468 A | * | 9/1971 | McClurkin .................. 454/192 |
| 3,960,196 A | | 6/1976 | Berner ......................... 160/222 |
| 4,045,997 A | | 9/1977 | Showalter et al. ............. 73/23 |
| D264,751 S | | 6/1982 | Smith ........................ D23/140 |
| 4,516,482 A | | 5/1985 | Smith |
| 4,946,718 A | | 8/1990 | Napadow .................... 427/424 |
| 4,979,432 A | | 12/1990 | Catan |
| 5,784,895 A | | 7/1998 | Choi ........................... 62/407 |
| 5,791,152 A | | 8/1998 | Choi ............................. 62/89 |
| 5,809,799 A | | 9/1998 | Jeon ............................ 62/408 |
| 5,870,898 A | | 2/1999 | Choi ............................. 62/89 |
| 5,896,752 A | | 4/1999 | Park ............................ 62/186 |
| 5,941,087 A | | 8/1999 | Lee ............................. 62/256 |
| 6,038,880 A | | 3/2000 | Oh .............................. 62/408 |
| 6,058,722 A | | 5/2000 | Choi ............................ 62/153 |
| 6,094,931 A | | 8/2000 | Jeong .......................... 62/407 |
| 6,105,377 A | | 8/2000 | Jeong et al. ................. 62/180 |
| 6,106,387 A | | 8/2000 | Smith ......................... 454/190 |
| 6,595,429 B1 | | 7/2003 | Carlson et al. ........... 236/44 R |
| 6,619,052 B1 | | 9/2003 | Nash, Jr. ...................... 62/89 |

FOREIGN PATENT DOCUMENTS

DE          2245265 A  *  3/1974   .............. F24F/9/00

* cited by examiner

Primary Examiner—Harold Joyce
(74) Attorney, Agent, or Firm—Holland & Hart LLP; Shane P. Coleman

(57) ABSTRACT

A conditioned vestibule for a cold storage doorway is disclosed. The vestibule includes a frame that supports inner and outer moveable door-forming members. The vestibule also includes a heater that circulates air between the inner and outer door-forming members and a variable-speed fan that varies flow of the air between the inner and outer door-forming members. In one embodiment, the airflow from the fan increases upon the opening of the door-forming members and decreases upon the closing of the door-forming members.

21 Claims, 4 Drawing Sheets

CONDITIONED VESTIBULE FOR A COLD STORAGE DOORWAY

RELATED APPLICATIONS

The present invention claims the benefit of the filing date of United Kingdom patent application no. 0300729.1, entitled "Conditioned Vestibule for a Cold Storage Doorway," filed Jan. 14, 2003, which is hereby incorporated by reference.

FIELD OF INVENTION

The present invention relates to a conditioned vestibule for a cold storage doorway.

BACKGROUND

Frozen and refrigerated goods are normally stored in refrigerated storage rooms or "cold storage" prior to being delivered to a retailer or end user. Frequent access to these cold stores is made via doors into the stores to both deliver and remove products therefrom. Access may be for personnel only but, more often, is for loading vehicles, such as fork lift trucks, that are able to deliver and remove products in bulk from the cold store.

The use of heavily insulated solid panel cold store doors with heated perimeter seals is one solution to maintain the integrity of a cold room envelope. However, a problem with this type of door is that damage to the door caused by collisions between fork lift truck traffic and the door is virtually unavoidable, even with high speed bi-parting doors. Cold store operators have recognized this problem and have tried to overcome it by adopting alternative door types, such as fabric roll-up doors. This has met with limited success since the doors inevitably open more slowly than equivalent-sized bi-parting horizontal sliding doors. If the door is left open, an inflow of relatively warm air is able to enter the cold store and cold air flows out of the store. This is undesirable because it allows ice crystals to form in the store and moisture droplets to form in the relatively warm side and also contributes significantly to the load on the refrigeration plant. Furthermore, ice can form on the floor around the doorway which is a safety concern. What is needed is an improved conditioned vestibule for a cold storage doorway.

SUMMARY

A conditioned vestibule for a cold storage doorway is disclosed. The vestibule includes a frame that supports inner and outer moveable door-forming members. The vestibule also includes a heater that conditions air between the inner and outer door-forming members and a fan that varies flow of the air between the inner and outer door-forming members. In one embodiment, the airflow from the fan increases upon the opening of the door-forming members and decreases upon the closing of the door-forming members.

A conditioned vestibule is also disclosed having a frame that defines a doorway opening, the frame comprising first and second side members and a horizontal top member connected to top portions of the first and second side members. The vestibule also includes a first set of moveable door-forming members connected to the frame and a variable-speed fan that circulates air across the opening and varies flow of the air by increasing the flow automatically upon opening of the door-forming members and decreases the flow automatically upon closing of the door-forming members.

A conditioned vestibule is also disclosed having a means for supporting first and second door-forming members to define a doorway opening and a means for opening and closing the first and second door-forming members. The vestibule also includes a means for circulating air between the first and second door-forming members and means for varying circulation of the air depending upon a position of the first and second door-forming members.

SUMMARY OF DRAWINGS

The detailed description will refer to the following drawings, wherein like numerals refer to like elements, and wherein.

DETAILED DESCRIPTION

Figure 1:
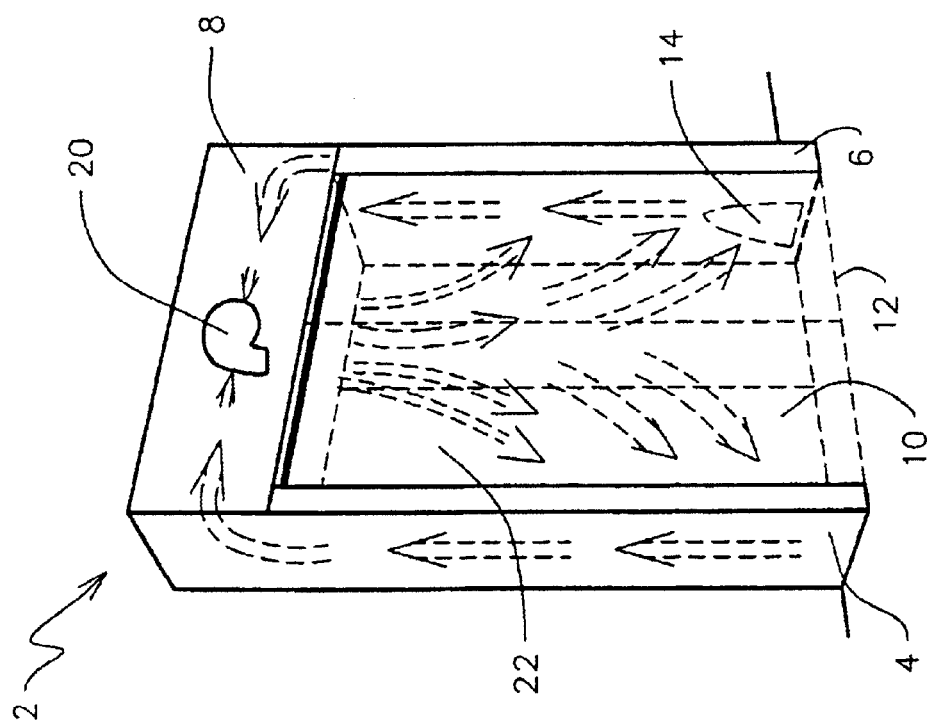
FIG. 1 is a schematic diagram of a conditioned vestibule for a cold storage doorway according to one embodiment of the present invention, with the door in the closed position.

FIG. 1 is a schematic diagram of one embodiment of a conditioned vestibule 2 for a cold storage doorway in a closed position. The vestibule 2 defines a doorway opening 22 between two rooms of a building having different temperatures, such as a warm room adjacent a cold storage room. The vestibule 2 comprises a frame having parallel side members 4, 6 (sometimes referred to as "side panels") and a horizontal top member 8 (sometimes referred to as a "top panel") connecting the side members 4, 6. In one embodiment, the top member 8 is a hollow duct formed from sheet metal or other suitable material and houses the fan and heater assembly 20, described herein. The side members 4, 6 comprise ducts, or plenums, that control airflow across the doorway opening 22, in one embodiment.

Two sets of door-forming members 10, 12 (also referred to herein as "doors") connect to the top member 8 and are shown in a closed position in FIG. 1. In one embodiment, the door-forming members 10, 12 are transparent polyvinyl chloride (PVC) strip curtains suspended from the top member 8. In this embodiment, one set of strip curtains is positioned toward the rear of the vestibule 2 and the other is positioned toward the front of the vestibule 2 to provide a gap of approximately 750 mm between the sets of curtains. In the example shown, the strips, or other door-forming members 10, 12, are suspended on a motorized concertina mechanism (not shown) that is able to move the door-forming members 10, 12 to an open position when activated. Alternatively, other types of door-forming members may be provided, such as single slide doors, single concertina doors, bi-parting slide doors, single or bi-parting horizontally rolling doors, single or bi-parting folding doors or hingedly mounted doors. In one embodiment, actuation means are provided to impart movement to the door-forming members.

Additionally, the vestibule 2 is provided with a variable speed fan and heater assembly 20. The assembly 20 includes a variable speed fan (not shown) and a heater (not shown). The fan and heater assembly 20 enables a controlled temperature to be maintained within the vestibule 2 by the heater when the door-forming members 10, 12 are in the closed position (shown in FIG. 1). In one embodiment, the fan and heater are positioned together in an assembly 20. In other embodiments, the fan and heater are separate.

In one embodiment, the volume of air exiting the fan increases automatically upon opening of the door-forming members 10, 12 and automatically decreases upon closing of the door-forming members 10, 12. The air volume may be controlled in various ways, such as increasing the speed of the fan motor (i.e., increasing the revolutions per minute (rpm) of the fan) or by maintaining the fan motor at a constant speed and using a mechanical damper to control the volume of airflow. Changing the volume of airflow upon opening the doors 10, 12 helps to reduce the interchange of air from one side of the vestibule 2 to the other when the doors 10, 12 are in their open position by effectively providing an air curtain across the doorway opening 22.

In one embodiment, the volume of airflow from the fan increases by 50–500%. In another embodiment, the airflow increases in a range of 50–150% upon opening of the door-forming members 10, 12. The exact speeds of the fan and the volume of airflow will depend upon the vestibule's size and site characteristics. In another embodiment, the airflow does not change upon opening or closing of the doors 10, 12.

In one embodiment, the air is directed down from the top member 8 and enters the side members 4, 6 of the frame through inlets 14 provided toward the base of the side members 4, 6 and passes back to the top member 8 where the air is re-circulated. In this example, air flow from the heater and fan is directed downwardly from the top member 8 of the frame and recirculated via inlets 14 provided towards the base of the side members 4, 6. Alternatively, the air flow may be directed horizontally between said side members 4, 6.

Upon closure of the doors 10, 12, the speed of the air discharged from the fan automatically switches back to its slower mode to circulate the reduced air flow through the vestibule 2 at a controlled temperature. This maintains a frost-free environment within the vestibule 2 to ensure that no ice or moisture accumulates on the doorway floor or on the door-forming members 10, 12. In the example of clear PVC strips used as door-forming members 10, 12, this ensures clear vision through the doorway opening 22 when the doors 10, 12 are closed because ice and moisture is not permitted to accumulate on the PVC strips.

In an example in which the fan motor speed is changed based on the door position, the detection of the opening and/or closing of the doors 10, 12 to automatically switch the speed of the fan is achieved by any suitable means, such as an inductive proximity switch to detect that the doors 10, 12 are not fully closed and, from this, to increase the speed of the fan. Alternatively, any type of limit switch may be used or a controller device which provides a signal derived from pulses produced by a rotary encoder device fitted internally to the door drive motor that controls movements of the door-forming members 10, 12. One skilled in the art will recognize that the mechanism for operation of the doors 10, 12 is not limited to a concertina mechanism. In other embodiments, for example, the doors 10, 12 may be single-slide doors, double slide doors, single concertina, bi-parting slide or hingedly mounted, or any combination or derivative of these.

The vestibule 2 may also be provided with a dehumidifier unit (not shown) that assists in the control of the moisture content within the vestibule 2. Furthermore, an insulated doorway (not shown) may also be provided within the doorway opening 22, such as a rolling type door, to provide a secured doorway. In one embodiment, the rolling type door would be lowered from the top member 8 of the frame to securely close the doorway opening 22 when frequent access through the doorway opening 22 is not required. An additional security door (not shown) may also be provided for sealing the vestibule 2, for example being of a rolling-type. In one embodiment, the security door provides insulation.

Figure 2:
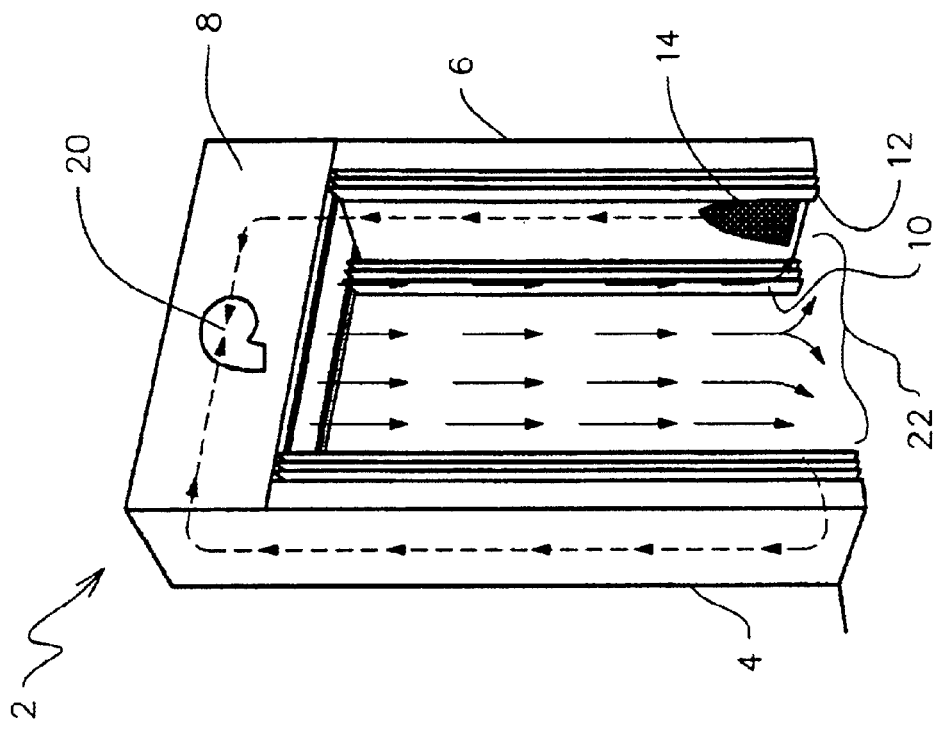
FIG. 2 is a schematic diagram of the conditioned vestibule for a cold storage doorway of FIG. 1, shown with the doors in the open position.

FIG. 2 is a schematic diagram of the conditioned vestibule 2 for a cold storage doorway of FIG. 1, shown with the doors 10, 12 in an open position. In the example of FIG. 2, the doors 10, 12 are formed from PVC strips suspended from the top member 8 of the frame. A motor (not shown) controls movement of the strips, causing the strips to open and close the doorway. When the doors 10, 12 are in a closed position shown in FIG. 1, the fan (part of the assembly 20 in this example) operates at a first speed, to force air across the doorway opening 22 between the two door-forming members 10, 12. When the doors 10, 12 are opened to the open position shown in FIG. 2, the fan increases in speed to a second speed in order to increase the volume of airflow across the doorway opening 22. In one example, the fan increases in speed by 50–150%. When the doors 10, 12 are then closed (as shown in FIG. 1) the fan decreases in speed and, in one embodiment, returns to the first speed.

Figure 3:
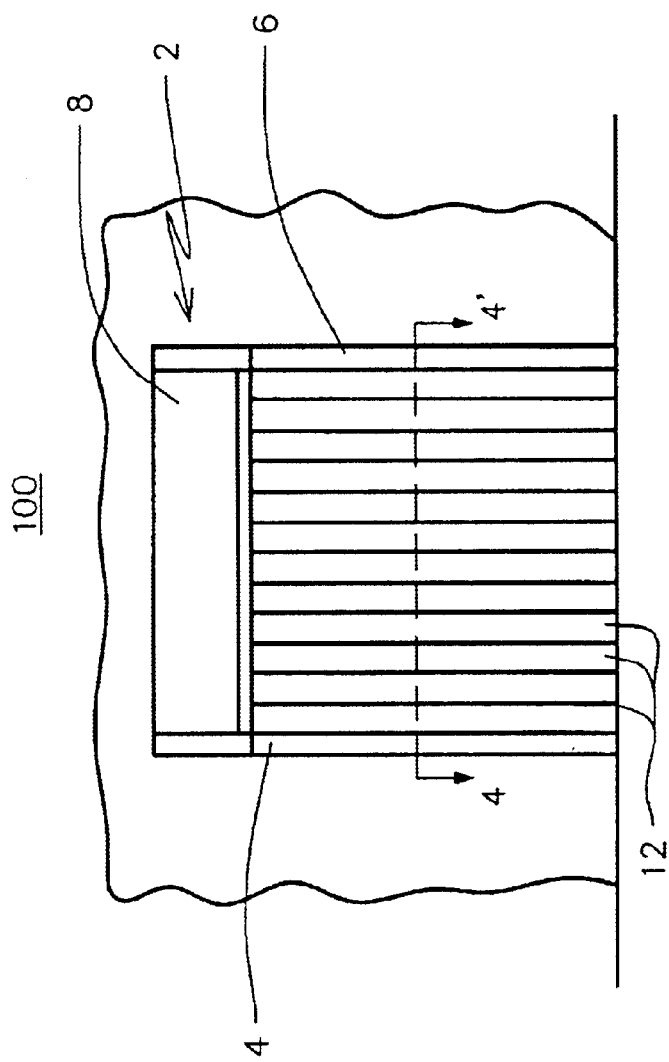
FIG. 3 is an elevation view of the conditioned vestibule shown in FIGS. 1 and 2 with the doors in the closed position.

FIG. 3 is an elevation view of the conditioned vestibule 2 shown in FIGS. 1 and 2 with the doors 10, 12 in a closed position. Only one door 12 is shown in FIG. 3, because the second door (10 in FIGS. 1 and 2) is obscured from view by the first door 12. As illustrated in FIG. 3, the strips form doors 10, 12 that trap the circulated air therebetween, when the doors 10, 12 are closed. The vestibule 2 is positioned in an opening (22 in FIGS. 1 and 2) in a wall 100 that separates a cold storage room from another room.

Figure 4:
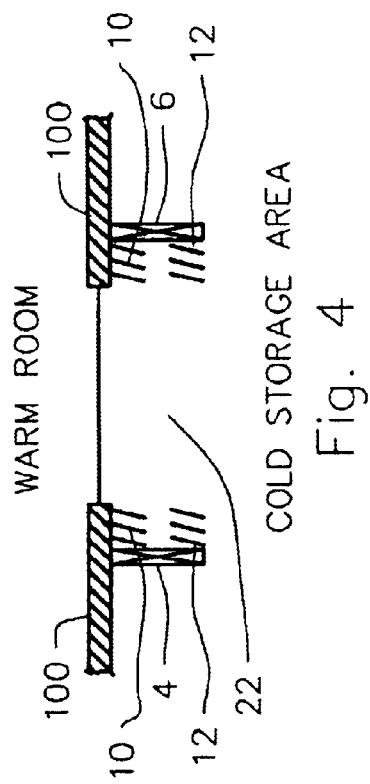
FIG. 4 is a cross-section of the conditioned vestibule shown in FIG. 3 taken along the line 4–4'.

FIG. 4 is a cross-section of the conditioned vestibule 2 shown in FIG. 3 taken along the line 4–4', with the doors 10, 12 in the open position. In this example, the doors 10, 12 are formed from PVC strips that part in the middle of the doorway and retract into opposing side members 4, 6 of the frame when the doors 10, 12 are open. In one embodiment, the doors 10, 12 are spaced approximately 250–2500 millimeters apart when the doors 10, 12 are in the closed position. In another embodiment, the doors 10, 12 are spaced approximately 500–1000 millimeters apart from each other. In still another embodiment, the doors 10, 12 are spaced approximately 750 millimeters apart.

Figure 5:
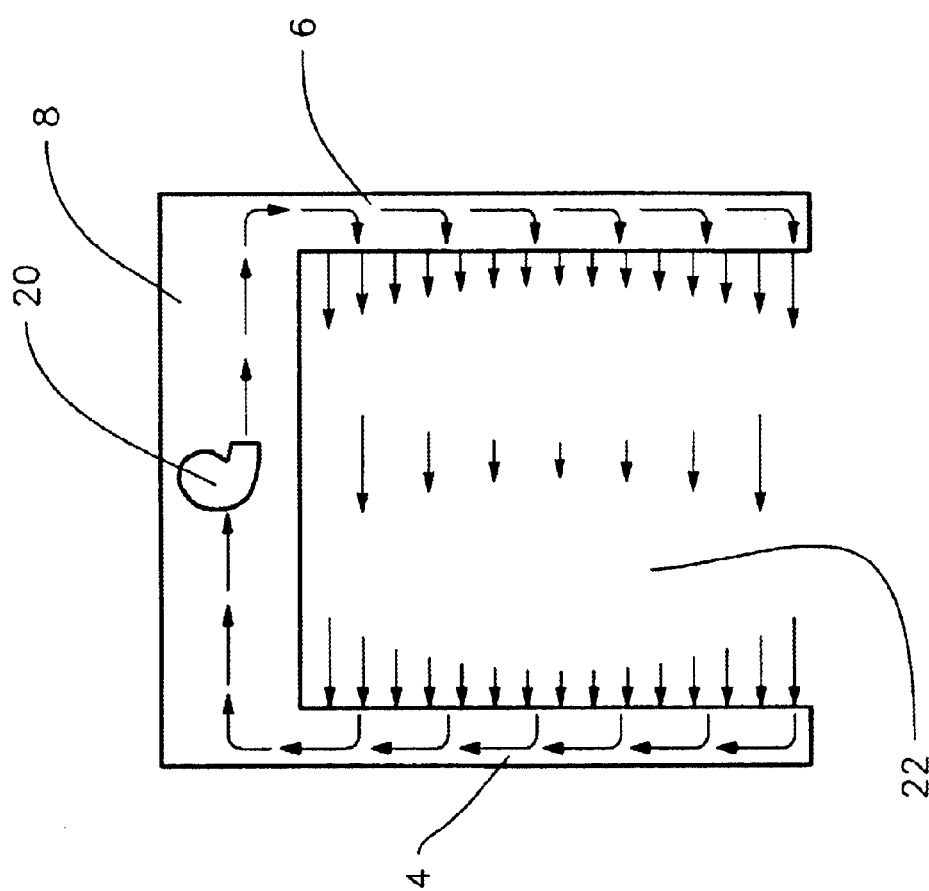
FIG. 5 is another embodiment of a frame with the door-forming members removed, illustrating horizontal air movement across the doorway opening.

FIG. 5 is another embodiment of a frame with the door-forming members 10, 12 removed, illustrating horizontal air movement across the doorway opening 22. In the embodiment of FIG. 5, the air is forced across the doorway opening 22 horizontally. Air exits a first manifold on the right side of the example diagram of FIG. 5, which serves as an air discharge means. Air enters a second manifold on the left side of the example diagram of FIG. 5, which serves as an air inlet means. In this example, the manifolds extend along the lengths of the side members 4, 6 of the frame. Also, the length of the arrows shown across the opening in FIG. 5 reflects the relative air momentum at different points. As shown, the air momentum is greater at the upper and lower ends of the air discharge means, in this embodiment.

In one embodiment, the air discharge means (24 in FIG. 6) includes blades (25, 26 in FIG. 6) that deflect the air at varying angles relative to the first side member (e.g., 4) to counter two-way airflow (that is, airflow seeking to both enter and exit the cold storage room). Near the top of the air discharge means, the blades 25, 26 are positioned to deflect air toward the warmer side of the vestibule (away from the cold storage room) to counter relatively warmer air seeking to infiltrate the cold storage room. Near the bottom of the air discharge means 24, the blades 25, 26 are positioned to deflect air toward the colder side of the vestibule 2 (toward the cold storage room) to counter relatively colder air seeking to exfiltrate the cold storage room. In one embodiment, the air is circulated across the vestibule 2 as described in U.S. Pat. No. 4,516,482 to George R. Smith, entitled "Conditioned Air Vestibule for Refrigerated Warehouse Doorway," which is hereby incorporated by reference. In another embodiment, the air is circulated horizontally across the vestibule 2 using one or more of the horizontal air curtains described in U.S. Pat. No. 6,106,387 to George R. Smith, entitled "Conditioned and Controlled Air Vestibule for Refrigerated Warehouse," which is hereby incorporated by reference.

In another embodiment, the blades 25, 26 deflect air in a single direction, toward or away from the cold storage room to counter one-way airflow, for example, created by exhaust fans in the building. In another embodiment, the blades 25, 26 deflect the air straight across the doorway opening 22. In still another embodiment, the blades 25, 26 are flexible insofar as they may be turned to change their orientation. In this example the flexible blades 25, 26 may be manufactured in a generally straight position and then adjusted on-site to counter opposing air flow. In another embodiment, the orientation of the flexible blades 25, 26 is controlled dynamically, after installation of the vestibule 2. For example, the orientation of the blades 25, 26 may be controlled electronically.

In still another embodiment, the orientation of the blades 25, 26 changes based on the door position. When the doors 10, 12 are closed, the blades 25, 26 direct air generally straight across the doorway opening 22. When the doors 10, 12 open, the blades 25, 26 automatically adjust their orientation from a first, static position to a second position that counters the air flow (e.g., toward the cold storage area at the bottom of the vestibule and away from the cold storage area near the top of the vestibule, to counter two-way airflow). When used in connection with PVC strips as the doors 10, 12, the change in blade orientation helps to maintain the strips together when the doors 10, 12 are closed because the airflow is redirected straight across the doorway opening 22 (and not toward the strips) when the doors 10, 12 are closed. In another embodiment, the gap between the blades 25, 26 is adjustable and may widen or narrow automatically based upon the position of the doors 10, 12.

Figure 6:
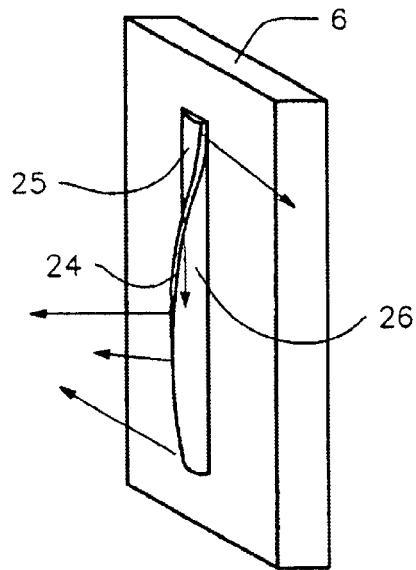
FIG. 6 shows an example side member used in connection with an embodiment of the vestibule that discharges air generally horizontally across the doorway opening to counter two-way airflow.

FIG. 6 shows an example side member 6 used in connection with an embodiment of the vestibule 2 that discharges air generally horizontally across the doorway opening (22 in FIG. 1). The example side member 6 in FIG. 6 includes an air discharge means 24 formed by two blades 25, 26 that run generally along the length of the side member 6 from top to bottom. The arrows exiting the air discharge means 24 show the flow of air out of the air discharge means 24. In this embodiment, the air discharge means 24 directs the air generally horizontally across the doorway opening (22 in FIG. 1). In this embodiment, the discharged air is returned to the fan and heater assembly (20 in FIG. 1) via an air return means (not shown) in the opposing side member (4 in FIG. 1). In one example, the air return means (not shown) is an elongated inlet hole that runs along substantially the entire length of the opposing side member (4 in FIG. 1). In one embodiment, the air discharge means varies the momentum of the discharged air along the length of the side member 6. For example, more air may be discharged faster near the top and bottom of the side member 6 than at the middle. In this example, the air return means may be shaped accordingly to accept a greater volume of returned air near the top and bottom of the opposing side member 4. In another embodiment, no blades 25, 26 are used as part of the air discharge means and instead air is discharged through an opening or nozzle without directional blades 25, 26.

Figure 7:
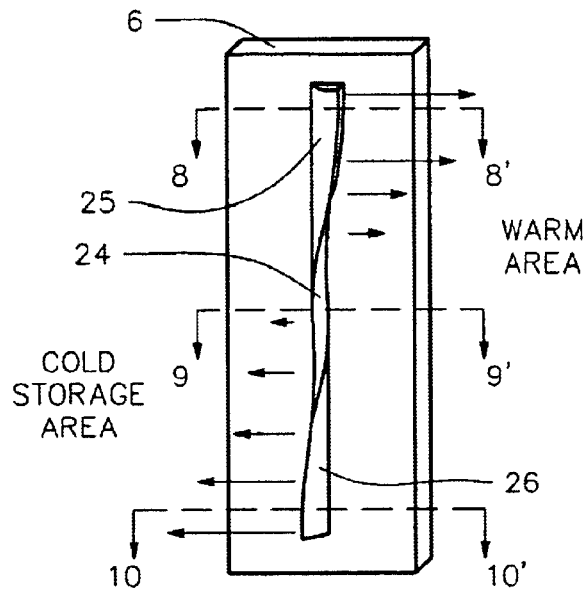
FIG. 7 shows a front view of one embodiment of the side member with the longitudinal air discharge means shown in FIG. 6.

FIG. 7 shows a front view of one embodiment of the side member 6 with the longitudinal air discharge means 24 shown in FIG. 6. In FIG. 7, the blades 25, 26 of the air discharge means 24 change orientation along the length of the side member 6. Near the top of the side member 6, the blades 25, 26 deflect the air toward the warm area (toward the right of this diagram) to counter relatively warmer air seeking to infiltrate the cold storage room near the top of the side member 6. Near the bottom, or base, of the side member 6, the blades 25, 26 deflect the discharged air toward the cold storage area to counter relatively cooler air seeking to exfiltrate the cold storage area near the bottom of the side member 6.

Figure 8:
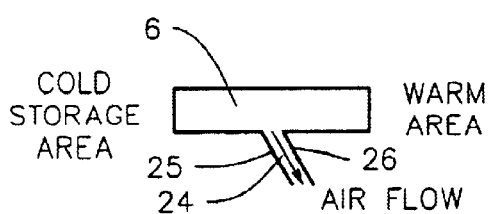
FIG. 8 is a cross-section of the side member taken near the top of the side member.
Figure 10:
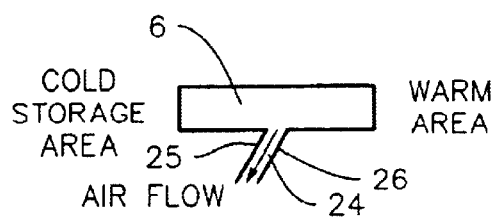
FIG. 10 shows a cross-section of the side member taken near the base of the side member.
Figure 9:
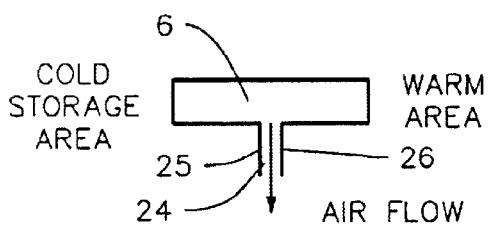
FIG. 9 is a cross-section of the side member taken near the middle of the side member, where the air is deflected substantially straight across the doorway opening.

FIGS. 8, 9, and 10 show cross-sections of the side member 6 shown in FIG. 7, taken along the lines 8–8', 9–9', and 10–10', respectively. FIG. 8 is a cross-section of the side member 6 taken near the top of the side member 6. The blades 25, 26 of the air discharge means 24 deflect the air toward the warm area to counter relatively warmer air seeking to infiltrate the cold storage room near the top of the side member 6. FIG. 9 is a cross-section of the side member 6 taken near the middle of the side member 6, where the air is deflected substantially straight across the doorway opening (22 in FIG. 1). FIG. 10 shows a cross-section of the side member 6 taken near the base of the side member 6. Near the base of the side member 6, the blades 25, 26 deflect the air toward the cold storage room to counter relatively cold air seeking to exfiltrate the cold storage room.

Although the present invention has been described with respect to particular embodiments thereof, variations are possible. The present invention may be embodied in specific forms without departing from the essential spirit or attributes thereof. For example, the door-forming members 10, 12 may be created using a variety of suitable door-types. Similarly, various means may be used to circulate the air across the doorway opening 22 between the doors 10, 12. It is desired that the embodiments described herein be considered in all respects illustrative and not restrictive and that reference be made to the appended claims and their equivalents for determining the scope of the invention.

What is claimed is:

1. A conditioned vestibule for a cold storage doorway, comprising:

a frame that supports inner and outer moveable door-forming members, wherein the frame comprises first and second side members positioned on opposite sides of the doorway opening;

a heater that conditions air between the inner and outer door-forming members;

a fan that varies flow of the air between the inner and outer door-forming members;

air discharge means that receives the air from the fan and discharges the air across the doorway opening, wherein the air discharge means comprises a pair of blades running generally lengthwise along the first side member, wherein the blades direct air discharged from an opening positioned between the blades across the doorway opening to an inlet in the second side member, wherein the blades are positioned in a first orientation when the door-forming members are closed and automatically adjust to a second orientation when the door-forming members are open; and air return means that receives the air discharged across the doorway opening and returns the air to the fan for recirculation.

2. The vestibule of claim 1, wherein airflow from the fan increases automatically upon opening of the door-forming members and decreases automatically upon closing of the door-forming members.

3. The vestibule of claim 2, wherein the speed of the fan increases 50–500% upon the opening of the door-forming members.

4. The vestibule of claim 1, further comprising actuation means that control movement of the door-forming members.

5. The vestibule of claim 1, wherein the door-forming members comprise a plurality of strip curtains.

6. The vestibule of claim 5, wherein the strip curtains are transparent strip curtains formed from a polyvinyl chloride (PVC).

7. The vestibule of claim 5, further comprising a motorized concertina mechanism that suspends the strip curtains.

8. The vestibule of claim 1, wherein the frame comprises first and second substantially parallel side members connected by a horizontal top member.

9. The vestibule of claim 8, wherein the inner and outer door-forming members are spaced apart by a gap in the range of 250–2500 millimeters when the door-forming members are in a closed position.

10. The vestibule of claim 8, wherein the inner and outer door-forming members are spaced apart by a gap of approximately 750 millimeters when the door-forming members are in a closed position.

11. The vestibule of claim 1, wherein the frame comprises first and second side members and a top member that connects to the first and second side members, wherein the air discharge means discharges the air from the top member, and wherein the air return means comprises an inlet positioned proximate a base of the first side member.

12. The vestibule of claim 1, wherein the blades direct the air across the doorway, opening in a generally horizontal direction.

13. The vestibule of claim 1, wherein the air discharge means changes a direction in which the air is discharged based upon whether the door-forming members are in the open or closed position.

14. A conditioned vestibule comprising:

a frame that defines a doorway opening, the frame comprising first and second vertical side members and a horizontal top member connected to top portions of the first and second side members;

a first set of moveable door-forming members connected to the frame;

a variable-speed fan that circulates air across the opening and varies flow of the air by increasing the flow automatically upon opening of the door-forming members and decreases the flow automatically upon closing of the door-forming members; and an air discharge means that changes a direction in which air is discharged across the opening based upon whether the door-forming members are in an open position or a closed position.

15. The vestibule of claim 14, wherein the frame further comprises an air discharge means and an air return means, each in communication with the fan, wherein the air is directed across the opening from the air discharge means to the air return means.

16. The vestibule of claim 14, wherein the air discharge means comprises first and second blades that direct the discharged air across the opening, wherein the blades are positioned in first and second orientations corresponding to the open and closed positions of the door-forming members.

17. A conditioned vestibule comprising:

means for supporting first and second door-forming members to define a doorway opening;

means for opening and closing the first and second door-forming members;

means for circulating air between the first and second door-forming members, wherein said means comprises means for directing the air in a first direction when the door-forming members are in an open position and in a second direction when the door-forming members are in a closed position; and means for varying circulation of the air depending upon a position of the first and second door-forming members.

18. The vestibule of claim 17, wherein the means for varying comprises means for increasing circulation of the air across the opening when the first and second door-forming members are in an open position and means for decreasing the circulation of the air when the first and second door-forming members are in a closed position.

19. The vestibule of claim 17, wherein the means for circulating comprises:

means for discharging the air across the doorway opening, between the first and second door-forming members;

means for receiving the air, said means for receiving being positioned across the doorway opening from the means for discharging; and means for conducting the air from the means for receiving to the means for discharging.

20. The vestibule of claim 17, wherein the means for circulating comprises a fan that runs at a first speed when the door-forming members are in a closed position; and wherein the means for varying circulation comprises:

means for increasing the fan to a second speed that is 50–150% faster than the first speed, when the door-forming members are in an open position; and means for returning the fan to the first speed when the door-forming members return to the closed position.

21. A conditioned vestibule for use in connection with a cold storage room, the vestibule comprising:

a frame comprising first and second substantially parallel side members, wherein the first side member comprises an air discharge means running along substantially the entire length of first side member and wherein the second side member comprises an air inlet;

a top member connected to the first and second side members, wherein the top member and the first and second side members define a doorway opening;

inner and outer bi-parting door-forming members connected to the frame, wherein the door-forming members can be positioned in open and closed positions, wherein the inner and outer door-forming members are spaced apart from each other by a distance in the range of 250–2500 millimeters when the door-forming members are in the closed position; and wherein the air discharge means directs air in a first direction when the first and second door-forming members are in the open position and in a second direction when the first and second door-forming members are in the second position;

a heater; and a fan in communication with the heater, wherein the fan circulates air across the doorway opening from the air discharge means to the air inlet, wherein the fan circulates air at a first speed when the door-forming members are in the closed position and automatically increases the air speed to a second speed that is 50–500% faster than the first speed when the door-forming members are in the open position.

* * * * *